Jan. 27, 1970                F. MASSA                3,492,633
            MUTUAL DAMPING ARRANGEMENT FOR HYDROPHONES
                      Filed March 27, 1968
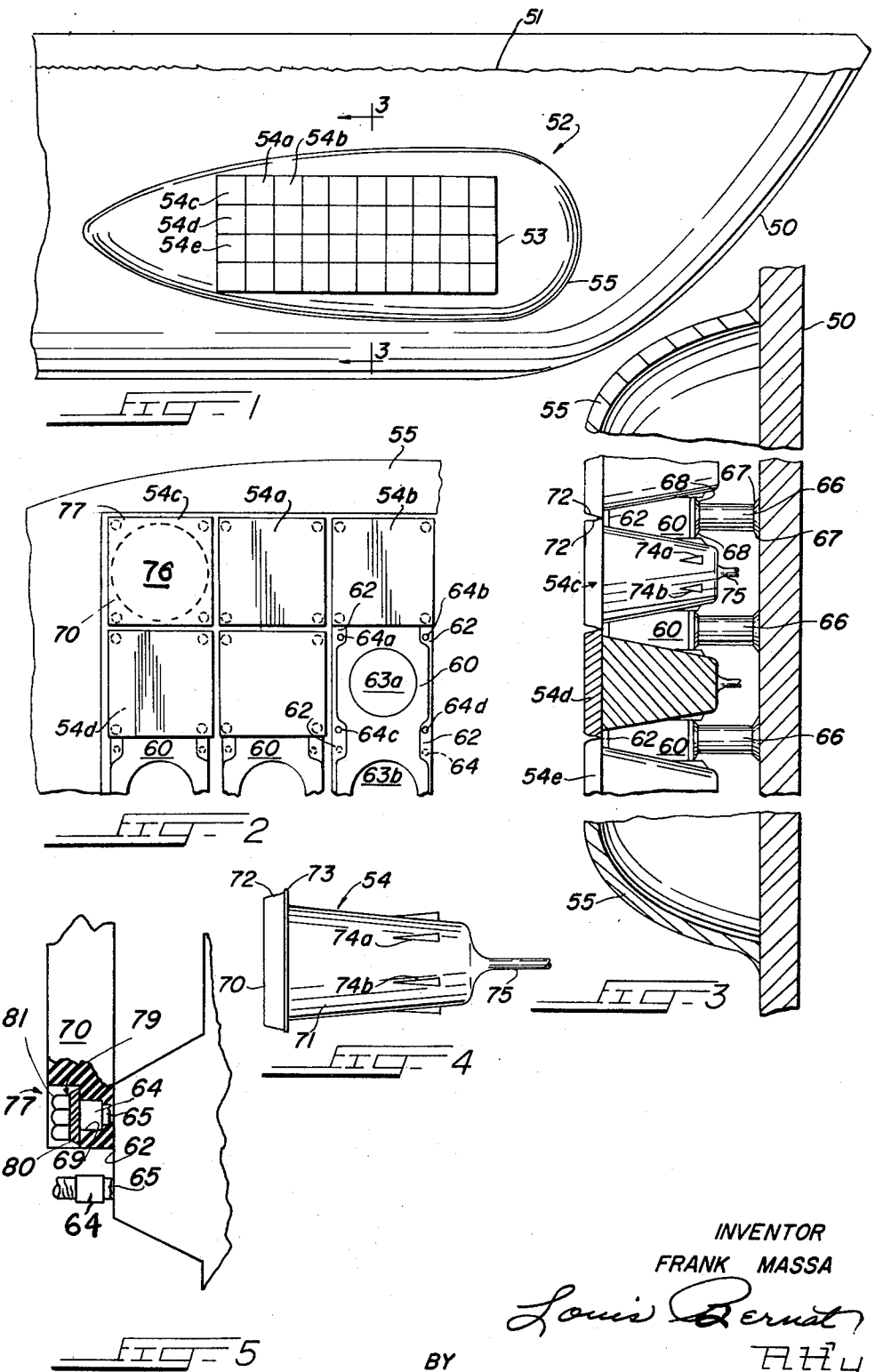
INVENTOR
FRANK MASSA
BY Louis Bernat
ATTY United States Patent Office 3,492,633
Patented Jan. 27, 1970

3,492,633
MUTUAL DAMPING ARRANGEMENT
FOR HYDROPHONES
Frank Massa, Cohasset, Mass., assignor to Dynamics Corporation of America, Massa Division, Hingham, Mass.
Continuation-in-part of application Ser. No. 693,348, Dec. 26, 1967. This application Mar. 27, 1968, Ser. No. 716,529
Int. Cl. G01v 1/24
U.S. Cl. 340—8    3 Claims

ABSTRACT OF THE DISCLOSURE

A plurality of underwater transducers are attached to an array of structural members having transducer receiving openings formed therein. Each transducer assembly is individually enclosed in a flexible, waterproof covering. When the transducers are forced into the openings, there is such a very snug fit that the waterproof covering is compressed between the openings and the surface of the transducer assembly. The resulting structure provides a mutual damping wherein the transducer assembly damps vibration in the mounting structure and the structure damps the unwanted motion of the transducer assembly.

This is a continuation-in-part of my copending application entitled, "Conformal Array of Underwater Transducers," Ser. No. 693,348, filed Dec. 26, 1967, and assigned to the assignee of this invention.

This copending application shows a conformal array of transducers attached to the hull of a ship for providing a sonar field in the water adjacent the ship. The transducers are energized individually and in manners which control the shape and direction of resulting sonar beams. There are, of course, uses for this invention other than conformal arrays attached to ships' hulls; therefore, the foregoing references to this particular usage are to be viewed as exemplary of the utility of the subject invention. Other uses will readily occur to those who are skilled in the art.

When the transducers are mounted in the manner disclosed in my copending application, they are held by structural frames which tend to build up a sympathetic vibrational pattern at their mechanical resonant frequencies. This structural vibration is translated to the sonar transducer system where it becomes evident in the wave shapes of the acoustic signals generated by the transducers. There is a resulting distortion which becomes intolerable when the system operates at high power or within the audible frequency range.

The severity of the problem becomes more apparent when one stops to reflect upon the many different surface dimensions of the mounting structure. Thus, there are natural resonances at many different frequencies. As a result, the main or desired sonar acoustical signal becomes distorted by spurious signals of so many different frequencies that normal damping or filtering becomes either very difficult or impossible to achieve.

Accordingly, an object of this invention is to provide a superior array of hydrophones which have a mutual damping with their supporting structures. In this connection, an object of the invention is to eliminate spurious resonant vibrations of parts associated with a transducer and its mounting structure.

Yet another object is to provide lightweight means for mounting rows of transducers having resilient outer coverings. Here an object is to mount the transducers on their supporting structures, with the mechanical coupling being via the resilience of the outer hydrophone covers so that any mutual vibrations between the housings and transducer assemblies tend to be mutually cancelling. Thus, an object is to prevent the transducers from exciting any natural mechanical resonances in their supporting structure.

Yet another object is to provide a transducer having a plurality of compressible areas on its housing, and a mating support frame for accurately locating said transducers with said areas held in tight compression against the frame.

Still another object is to provide a conformal array of underwater transducers especially well suited for high power pulsed operations.

These and other objects are accomplished in a manner which will become more apparent from a study of the attached drawings, in which:

FIG. 1 is a plan view which shows a stylized ship's hull having a conformal array of underwater transducers mounted thereon;

FIG. 2 is an enlargement of the upper left-hand corner of the conformal array (shown in FIG. 1) with a few transducer elements removed from the mounting structure;

FIG. 3 is a cross-sectional view taken along line 3—3 of FIG. 1;

FIG. 4 is a side view which shows a transducer; and

FIG. 5 shows a cross-sectional view of a corner of the transducer assembly and an associated part of the mounting frame.

While these figures and the following specification refer to specific structures, it should be understood that the invention is not necessarily limited thereto. Quite the contrary, the appended claims are to be construed broadly enough to cover all equivalents reasonably falling within the true spirit and scope of the invention.

Briefly, a stylized ship's hull 50 is shown as having an underwater part which is below a water line 51. Mounted on the hull below this water line is a conformal array 52 of underwater transducers. The conformal array 52 includes a rigid, grid-like mounting frame 53 attached to part of an outer surface of the hull 50. A plurality of transducer elements (such as 54a–54e) are assembled in the mounting frame 53 with their acoustical radiating surfaces accurately positioned to drive sound waves outwardly into the sea. The contour of the frame 53 and transducers 54 flows smoothly from a fairing 55 surrounding the transducer field and along the streamlined lines of the hull 50.

In greater detail, the grid-like frame includes a plurality of channel-like frame sections 60 arranged side-by-side. Each channel frame is provided with an aligned series of mounting tabs 62 and transducer receiving openings 63. Each tab 62 includes a number of threaded studs 64 which are welded or otherwise attached at 65 so that four such threaded studs are concentrically located around each transducer receiving openings 63—as the studs 64a, 64b, 64c, 64d are here shown concentrically located around the transducer opening 63a.

In order to attach the channel-like frame members 60 to the ship's hull, a plurality of mounting strips 66 are attached, in any suitable manner, to the hull 50, as by welding at 67, for example. The channel-like frame members 60 are attached to the mounting strips 66, again as by welding at 68, for example. The frame members 60 and mounting strips 66 are orthogonally oriented so that they form the grid-like structure 53 having a plurality of openings therein for nestingly receiving and supporting the transducers.

While any suitable transducers may be used, I prefer a design which includes a vibratile flat piston surface, such as is shown in United States Patent No. 3,328,751, for example. Each transducer is completely covered with a flexible rubber-like compound which is molded in a general shape that should be apparent from an inspection of the drawings. This compound encloses the individual transducers in a completely waterproof housing. For ease of identification, one of these transducers 54d is crosshatched in FIG. 3 and is shown in some detail in FIG. 4.

Each transducer housing includes a flat, square part 70 enclosing vibratile plate piston diaphragm 76 which generates the sound waves that are driven out into the sea or other water. The somewhat truncated conical section 71 includes a transducer element for converting electrical signals into forces for mechanically driving the piston plate 76.

The face plate of the rubber-like housing is generally rectangular, as best seen in FIGS. 1 and 2; however, the vibratile plate piston 76 is circular. Thus, the corners such as 77 of the face plate are completely flexible. They have conterbored mounting holes 69 which are spaced apart to coincide with the spacing of the threaded mounting studs 64 on the channel 60 and tabs 62. In profile (FIG. 4), the flexible mounting face plate 70 is somewhat tapered (as at 72), ending in a web-like lip or ridge 73. The tapered sections of adjacent transducers form a V-shaped groove for receiving a sealant, as shown at 72, 72 near the top of FIG. 3.

A number of projecting, semi-conical, tapered, wedge sections 74 are provided near the back of the housing 71. When the back 71 of the transducer is pushed into the holes 63 of the grid-like frame 53, these projections 74 are tightly squeezed, and they act as a number of shock absorbing resilient wedges for securing the transducers in place. Finally, the rear wall of the housing 71 is sealed to a waterproof cable 75 for providing the electrical connections between the transducer and its associated control circuits.

To assemble the conformal array of transducers, the end 71 of each transducer element 54 is pushed into one of the transducer receiving openings 63. The resilient conical wedges 74 are tightly compressed within the openings to hold the rear of the transducer firmly, yet with some degree of shock mounting resilient. The studs 64 pass through the countersunk mounting holes 69 in the resilient corners 77 of the face plates 70. Then, lock washers 80 and nuts 81 are fitted over the ends of the studs 64. The nuts are turned onto the studs 64 to tightly compress the resilient corners of the face plate 70. The nuts pass down into the countersunk regions 79 of the soft rubber-like covering 70. The transducers are close enough together so that the thin ridges or web-like lips 73 are compressed together, thereby leaving the V-shaped grooves 72, 72 around each transducer face plate.

A resilient waterproof sealant is injected into all openings on the face of the conformal array of transducers. Primarily, these openings are the counterbored recesses above the mounting nuts (such as 81) and the V-shaped grooves 72, 72. However, any other irregularities or imperfections are also filled. Then, the sealant is carefully made smooth and flush with adjacent surfaces so that the entire conformal array has an uninterrupted and smooth streamlined surface—following any desired contour of the ship's hull. While the nature of the sealant is not too important, I prefer to use a flexible epoxy, polyurethane, or silicone rubber.

The mutual damping occurs this way. Assume that the frame 60 undertakes a relatively simple mechanical vibrational movement. The inertia of the transducer 54 initially tends to hold it stationary. Thus, some parts of the flexible housing of transducer 54 are stretched while other parts are compressed. For example, the flexible corners of plate 70 may be stretched at 64a, 64b, and compressed at 64c, and 64d. This way, the instantaneous mechanical movements of the frame 60 are compliantly opposed by the inertia of the transducer acting through the compliance of the housing.

An instant later, after a half cycle of mechanical vibrational movement, the situation is reversed. The flexible corners at 64a, 64b are compressed and the corners at 64c, 64d are stretched. Since the natural modes of vibration for transducer 54 and frame 60 are not tuned to the same frequency, the energy in the spurious vibrations will die out before the transducer 54 and frame 60 build up a mechanical motion whereby they are moving together as a unit.

The foregoing paragraphs have spoken in terms of the inertia of the transducer assembly stretching or compressing the flexible corners 77 of the housing face plate 70. The reverse is also true. If the transducer assembly begins to vibrate as a unit, the flexible corners 77 are restrained by the frame 60 which is relatively stationary. Likewise, the resilient wedges 74 provide mutual damping between the back of the transducer housing and the frame.

In a structure actually built and tested, it was found that the frame 60 could be struck repeated hammer blows with no more than a dull thud sound. With a similar structure not having the same degree of mutual damping, the frame 60 would ring with an almost musical quality when it was struck. There was no appreciable effect upon the motion of the plate piston 76 enclosed within the rubber-like face plate 70 as it responded to the driving forces of the transducer.

Still other embodiments will readily occur to those who are skilled in the art. Therefore, the appended claims are to be construed to cover all modifications and equivalents falling within the true scope and spirit of the invention.

I claim:

1. In combination in an electroacoustic transducer, a vibratile diaphragm, a housing structure, a flexible rubber-like material bonded to and projecting beyond the periphery of said diaphragm, a flexible rubber-like material bonded to the outer surface of said housing structure, flexible wedge-shaped projections spaced around the periphery of said rubber-like material surrounding said housing, a channel-shaped mounting frame with clearance holes in the surface of said channel for permitting the passage of said housing structure, a mounting surface on said frame to engage the projecting peripheral portion of said rubber-like material which surrounds said vibratile diaphragm, means for attaching said peripheral portion to said surface with said material held in tight compression, the clearance holes for the passage of said housing being dimensioned so that said wedge-shaped projections are tightly compressed by the peripheral interference of said clearance holes.

2. The invention in claim 1 characterized in that the cross-sectional shape of said housing structure is circular.

3. The invention in claim 2 further characterized in that said clearance holes are circular.

References Cited

UNITED STATES PATENTS 3,328,751   6/1967   Massa _____ 340—10

RICHARD A. FARLEY, Primary Examiner

B. L. RIBANDO, Assistant Examiner